INVENTORS
ROBERT GRAY
ROBERT ELLIS
BY Elmer J. Gorn
ATTY.

MAGNETIC RECORDER

Filed Aug. 24, 1946

INVENTORS
ROBERT GRAY
ROBERT ELLIS
BY Elmer J. Gorn
ATTY.

MAGNETIC RECORDER

Filed Aug. 24, 1946 4 Sheets-Sheet 3

INVENTORS
ROBERT GRAY
ROBERT ELLIS
BY Elmer J. Gorn
ATTY.

MAGNETIC RECORDER

Filed Aug. 24, 1946 4 Sheets-Sheet 4

INVENTORS
ROBERT GRAY
ROBERT ELLIS
BY Elmer J. Gorn
ATTY.

Patented Nov. 4, 1952 2,616,982

UNITED STATES PATENT OFFICE 2,616,982

MAGNETIC RECORDER

Robert Gray, Waltham, and Robert Ellis, Watertown, Mass., assignors to Raytheon Manufacturing Company, Newton, Mass., a corporation of Delaware Application August 24, 1946, Serial No. 692,890

6 Claims. (Cl. 179—100.2)

This invention relates to combination magnetic recording and reproducing devices and more particularly to portable devices of this class.

Heretofore, in the design of electromagnetic recording, attempts have been made toward reducing the bulk and weight of such devices. These attempts have been directed toward producing a unit of the size of a table model radio receiver and one in which the use of an adequate power supply was necessary to drive the means used for urging the recording medium along a predetermined path.

However, such prior types of magnetic recording and reproducing devices do not provide the size and mobility desired in certain fields of endeavor. For example, recording equipment of the class described for use in some fields must be portable, extremely compact, and have a power supply which does not require connection to an outside source of energy. Furthermore, the facility with which the recording medium can be handled is very important. It is desirable to remove the recorded medium without disturbing the equipment itself. Therefore, the present invention is directed toward providing a device of the class described incorporating the above-mentioned features and many others.

It is an object of the present invention to provide, in a device of the type above described, a complete magnetic recording and reproducing unit.

Another object is to provide a complete device of the type described which can be carried in the manner of an average size folding type camera and be approximately the same size.

A further object is to provide a cartridge containing the recording medium which can be inserted in or removed from the device with facility.

A still further object is to provide a cartridge containing the recording medium and an electromagnetic recording head wherein the recording medium is prepositioned with respect to said head and immediately ready for use.

Yet another object is to provide novel means for reeling and unreeling the recording medium when the cartridge above described is inserted in the device described.

Another and further object is one providing novel means for evenly distributing the recording medium on its supporting member during the reeling and unreeling of said medium.

Another and still further object is the provision of a control mechanism for simultaneously controlling the means for urging the recording medium along a predetermined path and the direction in which said medium moves.

The novel features which it is believed characterize the present invention are set forth with particularity in the appended claims. The invention itself, however, both as to organization and manner of construction, together with further objects and advantages thereof, may best be understood by reference to the following description, taken in connection with the accompanying drawings, in which:

Figure 1:
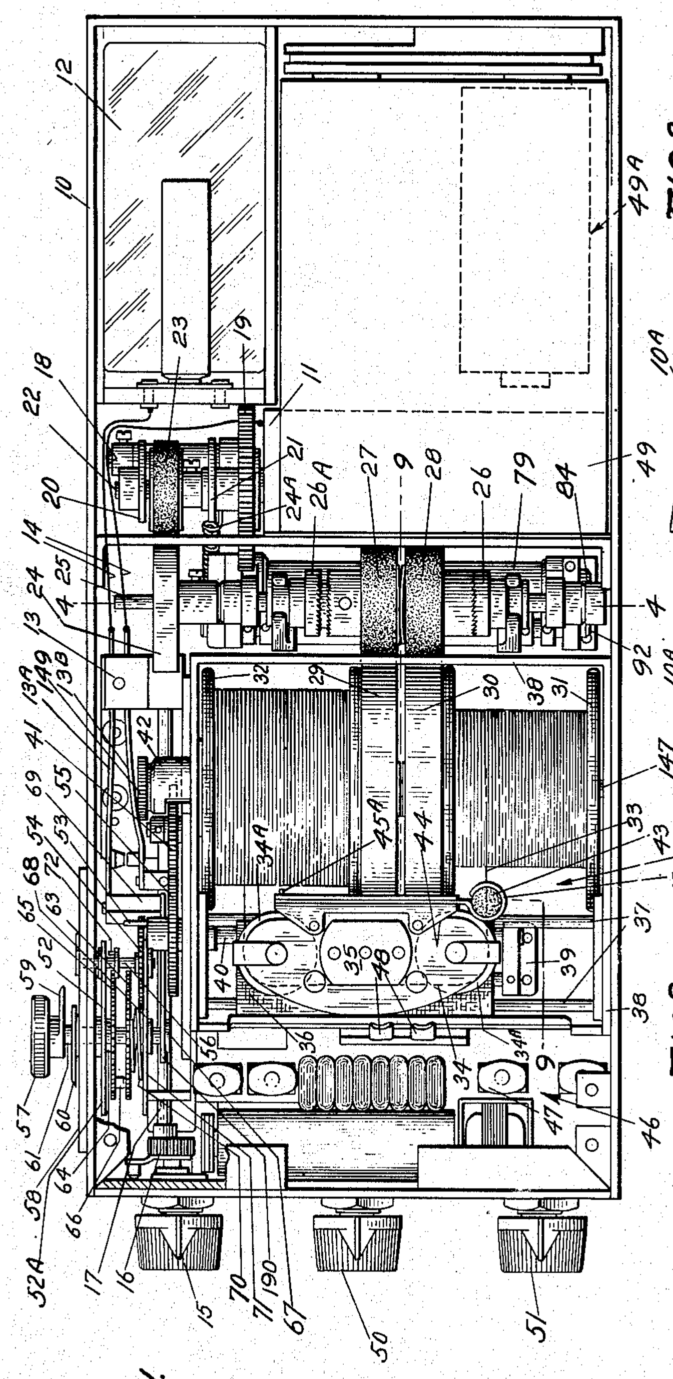
Fig. 1 is a view of one embodiment of the present invention looking down into the case of the device with the cover removed.
Figure 6:
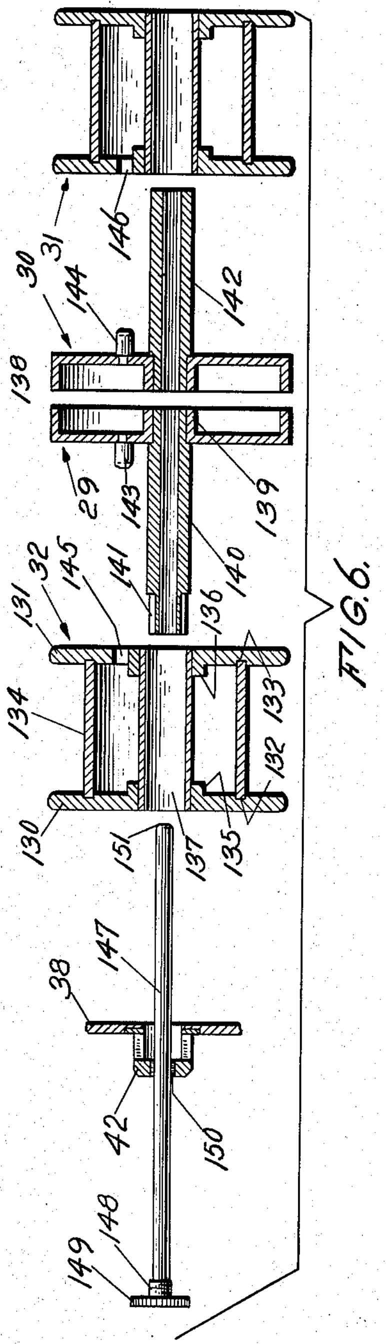
Figures 7, 8, 9, 10:
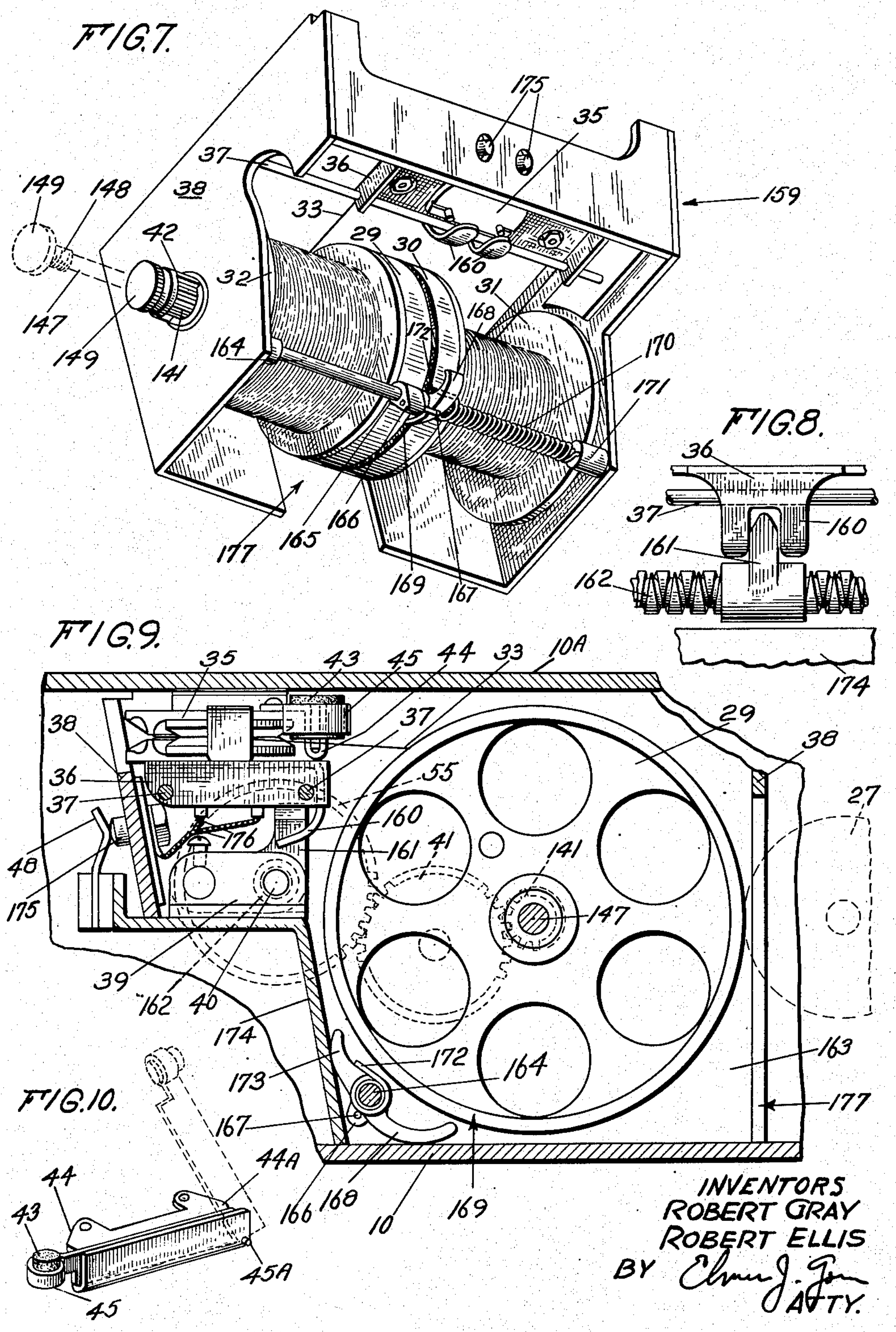
Figures 11, 12, 13:
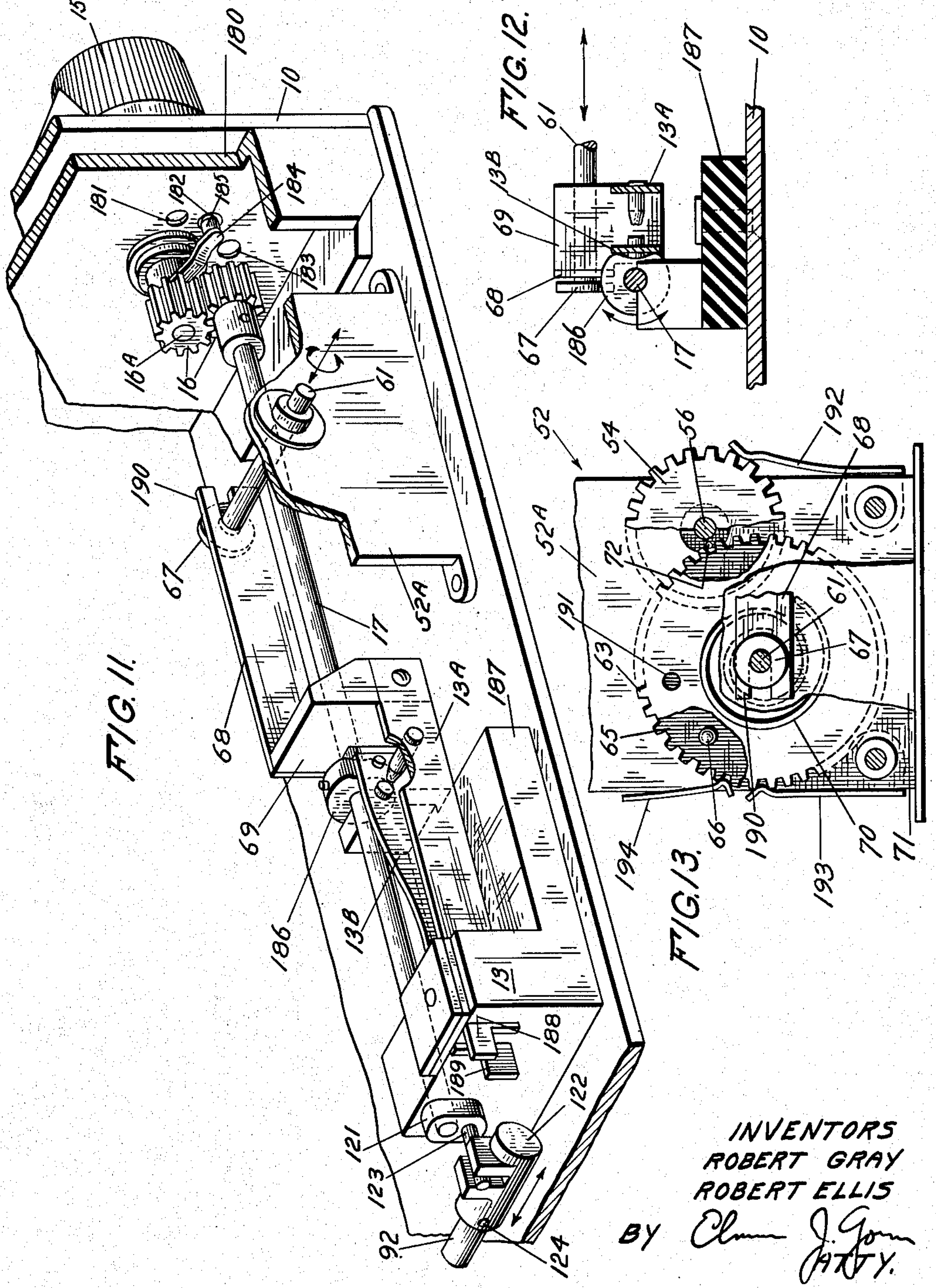

Fig. 6 presents an unassembled view, in cross-section, of the reels, their associated driving wheels, and the rod supporting the entire assembly;

Fig. 7 is a perspective view of the cartridge containing the electromagnetic head and medium and the means for maintaining the reel substantially immovable when removed from the device;

Fig. 8 illustrates a fragmentary view of the oscillating mechanism and the pronged member which engages said mechanism;

Fig. 9 represents a view, in cross-section of the cartridge with respect to the oscillating and driving mechanism, along line 9—9 of Fig 1;

Fig. 10 presents a perspective view of the readily demountable magnetic erasing means, the dotted portion showing how it is removed;

Fig. 11 illustrates, in perspective, a novel switching arrangement, for simultaneously controlling the current to the driving means and the direction of movement of the recording medium;

Fig. 12 is a detailed illustration of the cam arrangement for actuating the current-controlling means depicted in Fig. 11; and Fig. 13 is a fragmentary view of the recording time mechanism.

Referring more particularly to Fig. 1, the selected embodiment of the present invention comprises a case 10, preferably constructed of aluminum or equally light-weight metal, which houses the entire magnetic recording and reproducing means.

A fractional horsepower constant speed electric motor 11, energized by a rechargeable storage battery 12, of diminutive size, is the driving means for this unit. The control of current to said motor is through a switch 13 connected to a pair of conductors 14, one of which goes to one terminal of the battery 12 and the other to the motor 11; the remaining connection from the battery 12 to the motor 11 is via the case 10. The switch 13 comprises a pair of contact members 13A and 13B, supported in a block member 187, Fig. 11. The switch 13 is controlled by manipulation of a knob 15 through the agency of a pair of gears 16, a shaft 17 and a cam, illustrated in Fig. 11 as cam 186, attached to said shaft. The aforementioned control arrangement is illustrated in greater detail in Figs. 10 and 11 and will be discussed more thoroughly hereafter in connection with said illustrations.

Connected to a shaft 18 of the motor 11 is a driving gear (not shown) which engages and drives an appreciably larger gear 19. The gear 19 is held in engagement with the motor-driven gear (not shown) by a pair of link members 20 and 21 fastened to the shafts 18 and 22. The ratio of said last-named gears is such as to reduce the speed of a frictional driving wheel 23 to a value sufficient to impart a proper rate of speed to a driven wheel 24. The wheel 23 is covered with a resilient material, preferably rubber, and the driven wheel 24 is preferably fabricated of aluminum or similarly light-weight metal. The proper rate of speed mentioned above is a rate suitable for intelligible recording. The wheel 24, through the agency of a shaft 25, to which it is attached, drives a plurality of clutch members 26 and 26A. They in turn engage a pair of driving wheels 27 and 28, and said pair of wheels frictionally engage and drive a pair of reel-driving wheels 29 and 30 connected to a pair of reels 31 and 32, in a manner to be described below. Tension on the wheels 27 and 28 is maintained by a spring member 24A attached to the link 21, the other end of the spring being anchored to the bottom of the case 10. The spring 24A urges the wheel 23 toward the front of the case 10 and against the wheel 24. The wheels 27 and 28, having a common supporting shaft 25, are consequently urged in firm contact with the reel-driving wheels 29 and 30. The reels support a recording medium 33, and the driving wheels 27 and 28 urge said medium, through the agency of the wheels 29 and 30, along a path, indicted by a broken line 34, adjacent an electromagnetic recording and reproducing head 35.

A plurality of periphically grooved guide wheels 34A, in this particular embodiment a pair of such wheels, is used to guide the recording medium 33 along the path above mentioned. The wheels 34A have ball bearings to reduce the friction between said guide wheels and the recording medium to a minimum. Furthermore, the reduction of friction between said last-named components also reduces the torque imposed on the fractional horsepower motor used in this particular embodiment.

Figure 4:
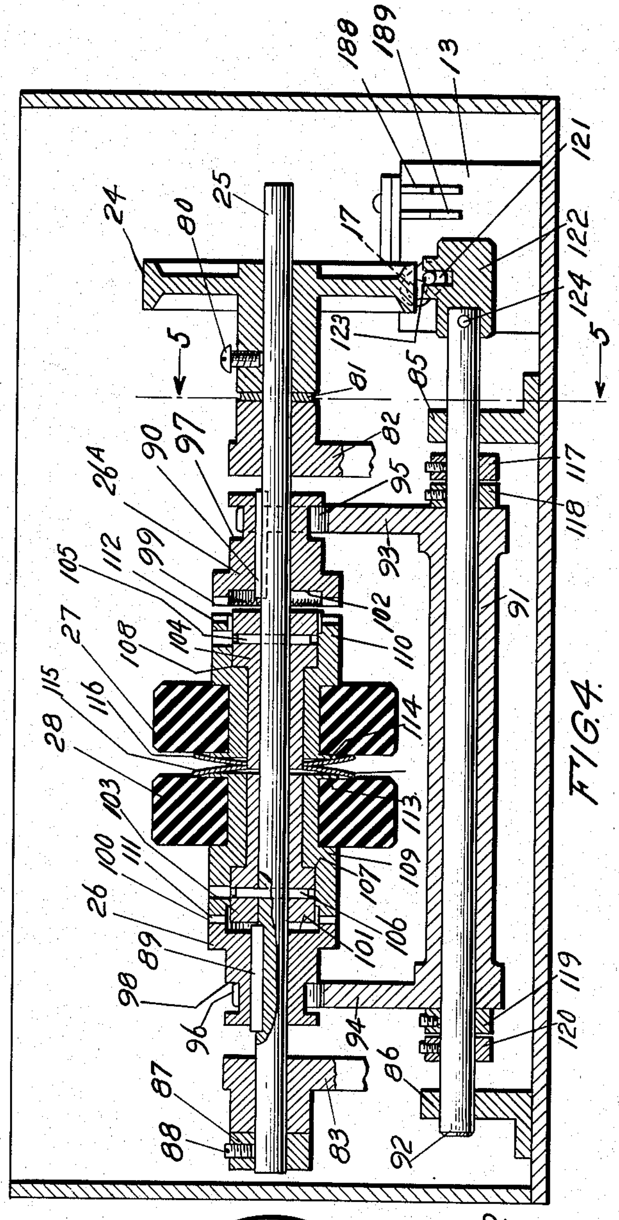
Fig. 4 illustrates a longitudinal view, in cross-section, of the mechanism for driving the reels supporting the recording medium, along line 4—4 of Fig. 1.
Figure 5:
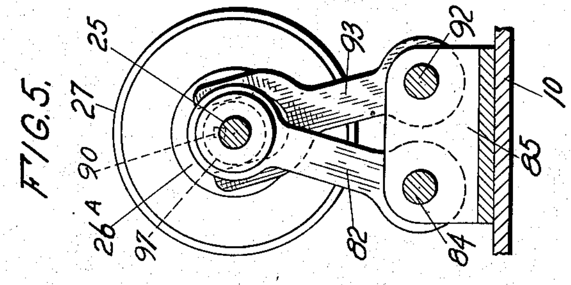
Fig. 5 is a partial transverse view of the reel-driving mechanism taken on line 5—5 of Fig. 4.

Details of the reel-driving mechanism are shown in Fig. 4 and of the reels 30 and 31 in Fig. 5. These items will be discussed at length in connection with said last-named figures.

The head 35 is supported on a member 36, said member being slidably carried by a pair of parallel rods 37 attached to the walls of a frame member 38. The frame member 38 supports a shaft, illustrated in Fig. 6 as shaft 147, which in turn supports the wheels 29 and 30 and the reels 31 and 32. All of the aforementioned components contained within said frame member 38 will be referred to hereinafter as a cartridge. The complete assembly of said cartridge is illustrated in Fig. 7 and will be further discussed in connection therewith.

Below said supporting member 36 can be seen a partial view of a mechanical oscillating mechanism 39. The oscillating mechanism (shown in detail in Fig. 8) imparts an oscillating motion to the support member 36 through the agency of a pronged member (see Fig. 8) connected to said supporting member and engaging said oscillating mechanism. The oscillating mechanism is actuated by a gear train comprising a driven gear 55, fastened to a shaft 40 which is integral with the oscillating mechanism 39. Motion is imparted to gear 55 by an intermediate gear 41 which receives its drive from a pinion, illustrated in Fig. 6 as pinion 141, integral with a hollow shaft, illustrated in Fig. 6 as shaft 140. The pinion extends into a hollow member 42 integral with the frame member 38 and in this position engages the gear 41. The hollow shaft 140 is attached to the wheel 29 and is driven thereby as above described. When the oscillating mechanism is set in motion, the consequent oscillation of the supporting member 36 causes an even distribution of the recording medium 33 on the reels 31 and 32.

A readily removable magnetic erasing head 43 is supported by a folded member 44. The erasing head, in this particular embodiment, is a permanent magnet which may be made of the material known to the trade as "Alnico." The member 44 is fastened, by suitable means, to the head 35. The erasing head 43 and its support 45 are readily positioned within the fold provided in member 44 and are maintained in this position by an extended portion 45A integral with the member 45 and supported within an aperture (not shown), provided for this particular purpose, in the supporting member 44. Details of the last-named components are described more thoroughly in connection with the illustration in Fig. 10. The position of the erasing head 43 is such that it follows the course of the recording medium without difficulty and has the added advantage that it can be removed from the supporting member 44 when the device is being used for recording, thus obviating the possibility of inadvertently erasing any recorded material.

In order to ascertain the amount of recording performed, a recording time mechanism 52 is provided. Said mechanism is supported between two wall members 52A and 71. The length of recording time selected for the particular embodiment is based on the capacity of the reels 31 and 32. It was determined that, for the amount of recording medium present on the reels, a recording period of thirty minutes would be required. Accordingly, a dial 58, Fig. 3, was inscribed to indicate a complete cycle of thirty minutes.

The recording time mechanism is actuated through the agency of the gear train comprising gears 55, 41 and the pinion enclosed within the hollow member 42. When said gear train is put in motion as above described, a pin 53, attached to the hub of the gear 55, engages and drives a gear 54 incorporated in said timing mechanism. Details of the operation of said timing mechanism will be discussed below and in connection with Fig. 13. A knob 57 serves to preset the amount of time, in minutes, it is desired to record. Said knob is pressed inwardly and a pointer 59 integral with said knob is rotated to the desired indication on the dial 58, Fig. 3. A second pointer 60, below the pointer 59, is positioned on said dial so that it coincides with the zero indication thereon, and in this position indicates that a full reel of recording medium is available for recording.

Figures 2, 3:
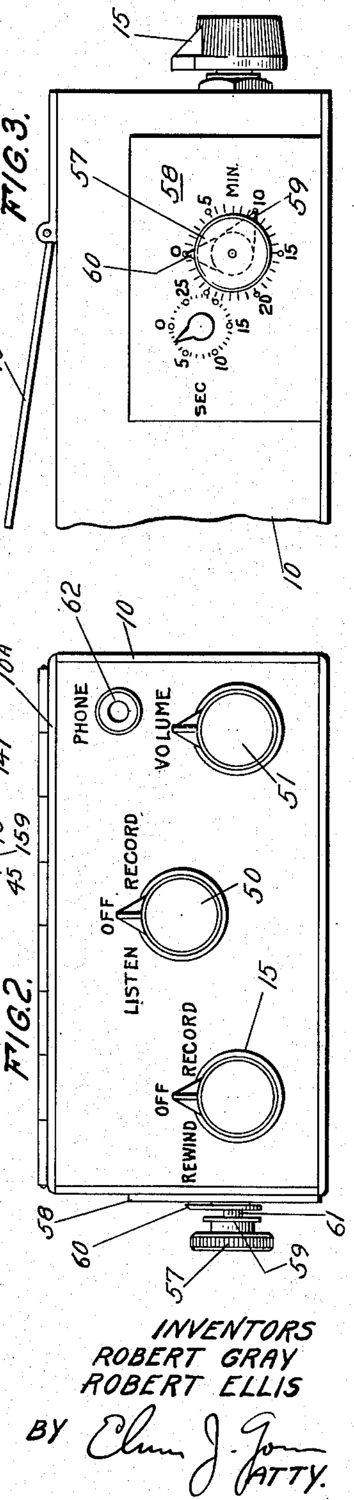
Fig. 2 is a view of the front of the device illustrating the controls for same.
Fig. 3 is a fragmentary view of the side illustrating a recording time indicator and a portion of the case cover.

Referring now to Fig. 2 there is illustrated a plurality of knobs 15, 50 and 51. The knob 15 manipulates the means controlling the energization of the motor for driving the recording medium along a path adjacent the head 35 and is so connected as to coact with the recording time mechanism 52 to render the energizing means ineffectual at the expiration of the desired recording time. Therefore, let it be assumed that the timing mechanism, through the agency of the knob 57, is set for a predetermined length of recording time and the knob 15 is set to the "record" position. As the recording time mechanism is actuated, the pointer 60 will commence moving around the inscribed scale 58. When said pointer 60 coincides with the pointer 59, the knob 57 will snap outwardly and interrupt the motor energizing means.

The interruption of the current to the motor, by the action of the timing mechanism, takes place in the following manner. Connected to the knob 57 is a shaft 61 to which is secured a gear 63. Said gear is provided with an aperture, illustrated in Fig. 13 as 191, in proximity to its outer edge. The pointer 59 is arranged so that it is in register with the aforesaid aperture. At the other end of the shaft 61, and integral therewith, is an annular member 67. This member retains in position a flat metal spring member 68, slotted at one end 190 thereof. The slotted end 190 of member 68 is placed athwart the shaft 61 adjacent the annular member 67, the other end of member 68 being fastened to a block of insulating material 69 and to this block is fastened the other end of the contact 13A. The reason for this particular arrangement will presently follow.

Carried by the shaft 61 is a hollow shaft 64 to which is attached a gear 65 and the pointer 60. This gear has secured to it a pin 66, in register with the pointer 60, said pin extending toward the gear 63. The pin 66 is so positioned on the gear 65 that when actuated it will be brought into coincidence with the aperture, illustrated in Fig. 13 as 191, provided in the gear member 63, in a manner which will be presently explained.

Assume it is desired to record for a period of ten minutes. Also assume that the pointers 59 and 60 are in the zero position with reference to the dial 58. In this position the pin 66 is in coincidence with the aperture and consequently a spring member 70, positioned between the gear 63 and the wall 71 of the recording time mechanism 52, will urge the gear 63 toward the gear 65. Since the gear 63 is secured to the shaft 61, the action of the spring 70 will cause said shaft 61 to pull member 68 in the same direction it is being urged. This will cause the contact 13A to move away from the contact 13B.

When the knob 57 is pressed in toward the dial 58 and rotated to the desired indication on said dial, it moves the gear 63 away from the gear 65 and disengages the pin 66 from the aperture in the gear 63. As a direct result, the contacts 13A and 13B are brought closer together. It requires, at this point, only the manipulation of the knob 15 to the "record" position to bring the contacts 13A and 13B into positive contact. The knob 15 through the agency of a cam arrangement, illustrated in Fig. 11 as cam 186, moves the contact 13B into contact with the contact 13A and at the same time urges the clutch 26 into engagement with the wheel 29.

Now as gear 65 rotates, due to the drive imparted to it by a driving pin 72 which is itself driven by the train of gears 55, 41, etc., the pin 66 will be caused to come into coincidence with the aperture in gear 63. When this occurs, said gear 63 will be urged toward the gear 65 and the recording will be interrupted due to the separation of the contacts 13A and 13B. The knob 15 is returned to the "off" position and is now ready to continue recording if desired, or to reproduce the already recorded material.

Having recorded for the assumed period and it is now desired to listen to, or reproduce, the recording, the knob 57 is pushed inwardly or toward the dial 58 and rotated to zero position, said position being the starting point of the recording time. The knob 15 is rotated from the "off" to the "rewind" position. This brings contacts 13A and 13B together and the same sequence of events above described take place with the following exceptions. The movement of the knob 15 rotates the shaft 17 and a cam, illustrated in Fig. 11 as a cam 121, secured to said shaft 17, causes the clutch 26A to move into engagement with the wheel 28, in a manner to be described below. Motion is consequently imparted to the reel 32 through its associated driving wheel 30 and as the medium 33 is drawn onto the reel 32 it causes rotation of reel 31 to take place. However, the reel 31 is now caused to rotate in a direction which is opposite to its former direction when the device was recording. As a result the drive to the recording time mechanism is also reversed. The pointer now rotates back toward the zero position on the scale 58 and when it arrives at coincidence with the pointer 59, the knob 57 again snaps outwardly and interrupts the operation of the device. The knob 15 is returned to the "off" position and the device is prepared for reproduction. For this last-named operation, the knob 50 is rotated to the "listen" position, the knob 59 pushed inwardly and set to the ten minute position on the scale 58, and the knob 15 again set to the "record" position. With the setting of the knobs as described above, the recorded material will be reproduced as will be presently described.

Encompassed within a compartment 46 is an audio amplifier employing a plurality of subminiature radio tubes 47. A pair of contacts 48 is provided in said amplifier for engaging a second pair of contacts (illustrated in Fig. 6) which are a part of the cartridge discussed hereinbefore. The relationship between the two pairs of contacts will be discussed in connection with Fig. 7. Plate current for the radio tubes 47 is provided by a battery 49, and a dry cell 49A (shown in dotted lines) serves as the filament supply for said tubes. Both sources of current are easily removed and replaced when necessary. The storage cell 12 can be removed with equal facility when it is necessary to recharge same.

The knob 50, hereinbefore mentioned in connection with Fig. 2, controls the manipulation of a switch (not shown) in the amplifier and provides means for switching from the "off" position to either the "listen" or "record" position. In the "record" position, connection is accomplished between an input jack 62, through the amplifier to the contacts 43 and from said contacts to the contacts, illustrated in Fig. 7 as contacts 175, connected to the head 35 within the cartridge 159. In the "listen" position the connections are reversed and the recorded material, induced in the recording medium 53, is conducted from the head 35 via the conductors, illustrated in Fig. 9 as 176, through the amplifier and to the jack 62 which now serves as an output for the reception of the recorded material. The knob 51 is attached to a volume control (not shown) provided for in the amplifier and operates in a manner familiar to those versed in the art.

Referring now more particularly to Figs. 4 and 5, Fig. 4 is a longitudinal view, in cross-section, of the reel-driving mechanism, and Fig. 5 a transverse partial cross-section of said mechanism. The driven wheel 24 is secured to the shaft 25 and maintained in position by a set screw 80. A washer 81, carried by said shaft, and made, preferably, of brass, is disposed between the hub of said wheel and a supporting arm 82 to reduce the friction therebetween. The supporting arm 82 and its counterpart 83 serve to support the shaft 25, the other ends of said supporting arms being carried by a shaft 84, Fig. 5, said shaft being in turn carried by a pair of base members 85 and 86. The supporting arms 82 and 83 are integral with an elongated base member 79, Fig. 1, to form a substantially U-shaped member, the base 79 of the U being carried by the shaft 84. It was necessary to omit the view of the member 79 in Fig. 4 to more clearly set forth the clutch-shifting arrangement to be described presently. Adjacent the end of the arm 83, which supports the shaft 25, is an annular member 87. The annular member is secured to said shaft by a set screw 88. When the annular member 87 is thus secured, it restricts any possible longitudinal motion of the shaft 87 for reasons that will be explained below.

Slidably carried by the shaft 25 is a pair of clutch members 26 and 26A. Both of said members are secured to the shaft 25 by a pair of keys 89 and 90, keyways being provided in said shaft and clutch members, respectively, for this purpose.

A second U-shaped member 91, having a pair of arms 93 and 94 integral therewith, is carried by a shaft 92. The shaft 92 is supported by the base members 85 and 86 and is slidably fitted to said base members so that said shaft can be moved longitudinally with ease. The arms 93 and 94 are terminated to form a plurality of open yokes 95 and 96 which engage a pair of annular grooves 97 and 98 provided for this purpose adjacent one end of the clutch members 26 and 26A. Gear teeth 99 and 100 are provided on the ends opposite the grooved ends of said clutch members. They are radially cut from the outer surface of said clutch members to the respective edges of circular depressions 101 and 102 provided in each of said clutch members. The last-named depressions are provided to allow the free movement therein of a pair of hollow shafts 103 and 104 which are carried by the shaft 25 and secured thereto, respectively, by a pair of pins 105 and 106. A portion of each of said hollow shafts is appreciably smaller in diameter than those portions which are attached to the shaft 25 and form, respectively, a pair of shoulders 107 and 108, on each of said shafts 103 and 104. The reason for this particular construction will be presently described.

Carried by the members 103 and 104 is a second pair of hollow shafts 109 and 110, the inside dimensions of said last-named shafts conforming substantially to the outer dimensions of the members 103 and 104 and having enough clearance therebetween to allow the hollow shafts 109 and 110 to rotate freely upon the members 103 and 104.

The ends of shafts 109 and 110 which face the gear-cut ends 99 and 100 of the clutch members 26 and 26A, are also provided with matching gear-cut ends 111 and 112 for engagement with 99 and 100. Opposite the ends 111 and 112 are flanges 113 and 114 integral with each of said shafts 109 and 110, whose circumferences are equal to the larger circumferences of said members 109 and 110. This arrangement provides a plurality of grooves for retaining therein the resilient driving wheels 27 and 28. Disposed between said wheels 27 and 28 is a plurality of bowed disks 115 and 116 which are carried by the hollow shaft member 104 on the diametrically smaller portion thereof. This last-named portion extends sufficiently beyond the flange 114 to carry said disks 115 and 116. When either of the wheels 27 or 28 are put in motion, the disk adjacent will be caused to rotate with it because the edges of the disks are forced into the sides of the wheels 27 and 28. As will be explained further, when one of said wheels rotate, the other is held stationary and because of the bowed configuration of said disks, the fact that their concave surfaces are in intimate contact with each other and that there is a sufficient tension between them causes them to have a braking effect on the wheels 27 and 28. The purpose of this particular arrangement will be presently explained. The particular concentric arrangement of the hollow shafts 103, 104, 109 and 110 provides means for assembling the wheels 27 and 28 with great facility. In practice the wheels 27 and 28 are placed in the grooves provided in the members 109 and 110. Then the members 103 and 104 are inserted within the members 109 and 110, in the position illustrated. Now the shaft 25 is inserted in the member 104 and secured to the shaft 25 by the pin 105. Following the latter step, the bowed disks 115 and 116 are placed on the shaft 25, in the position illustrated, and subsequently the member 103 is placed on the shaft and secured by the pin 106 to said shaft.

When thus assembled the wheels 27 and 28 rotate freely on the hollow shafts 103 and 104, said last-named shafts serving to retain the members 109 and 110 in a predetermined position on the shaft 25. The clutch members 26 and 26A are then placed on the shaft 25 and secured to said shaft by the keys 89 and 90 as described hereinbefore. How the balance of the components fit in with the assembled portion just described can be readily determined from the illustrations in Figs. 4 and 5. The steps for assembling the mechanism above described are by way of example only; other steps may be adapted by those skilled in the art.

Attached to the shaft 92 is a plurality of annular members 117, 118, 119, and 120. The members 118 and 119 maintain the U member 91 in a predetermined position on the shaft 92.

The members 117 and 120 restrict the longitudinal movement of the shaft 92 between the base members 85 and 86. Linear motion is imparted to the shaft 92 by a cam member 121, which is attached to the shaft 17, as shown more clearly in Fig. 11, when said shaft is manipulated by the knob 15.

A yoke-like member 122, positioned athwart the cam's pin 123, is attached to the shaft 92 by a pin 124 and, when the shaft 17 is caused to rotate as just described, motion is imparted to the shaft 92.

As illustrated in Fig. 4 the shaft 17 has been rotated so that the pin 123 has urged the shaft 92 and its associated components to move toward the right, with respect to the drawing, and thus caused the clutch 26 to engage the member 109. Since the clutch 26 is keyed to the shaft 25, rotation of said shaft will impart motion to the wheel 28. Therefore, the wheel 27 is left free to rotate on the hollow shaft 104 and would ordinarily rotate in the same direction as wheel 28 due to frictional engagement of the disks 115 and 116 disposed between them. However, since the wheels 27 and 28 are in frictional contact with the reel-driving wheels 29 and 30, as illustrated in Fig. 1, motion is imparted to the wheel 30, the direction of said wheel being such that the recording medium 33 is drawn onto the reel 31. As the medium 33 is drawn onto the wheel 31, said medium causes the reel 32 and its associated wheel 29 to rotate. When thus rotated, the wheel 29, which is frictionally engaged with the wheel 27, imparts thereto rotation in a direction opposite to the rotation of the wheel 28.

Therefore, the novel arrangement and cooperation of components above described provide braking means which prevent, under the conditions recited above, the continued rotation of reel 32 after reel 31 has ceased to rotate. The braking effect, produced by the coaction of the disks 115 and 116, is instantly effective with the cessation of motion of reel 31 and thus prevents reel 32 from overrunning itself and piling up the recording medium 33. Furthermore, the recording medium is kept substantially taut.

In the position where the cam's pin 123 is directly under the shaft 17, the clutches 26 and 26A will be disengaged from the members 109 and 110. Rotating the shaft 17 to the left, with respect to the drawing, causes the clutch 26A to engage the member 110 and in this position the reel 32 will now rotate in the direction first taken by reel 31; reel 31, now having imparted to it an opposite rotation, will cause the medium 33 to unwind from reel 31 onto reel 32, etc.

It will be evident from the aforegoing discussion that the members 109 and 110 should be maintained in proper position with respect to the clutch members 26 and 26A. This is accomplished by properly locating and fastening wheel 24 and annular member 88 to prevent any longitudinal movement of the shaft 25 to which the shafts 109 and 110 are fastened, and, since the members 24 and 88 abut the supporting arms 82 and 83, longitudinal motion of shaft 25, between said supporting arms, is positively inhibited.

The annular members 117 and 120, when fastened to the shaft 92, determine the longitudinal travel of said shaft and consequently bear a direct relation to the proper engagement of the clutch members 26 and 26A to the hollow shafts 109 and 110.

Referring now to Fig. 6, which illustrates in cross-section the preferred construction of the reels, the reel-driving means and the supporting means for same, it is desired to show how this novel construction permits rapid placement of the reels 31 and 32 upon their supporting and driving means 29 and 30 and the manner in which this assembly is mounted and held together.

The reels 31 and 32 preferably comprise a pair of disk members 130 and 131, which may be die cast, machined or punched and preferably fabricated or aluminum or similar lightweight material, said disks having circular grooves 132 and 133 for supporting a tubular member 134. In addition, raised bosses 135 and 136, concentrically positioned within the tubular member 134, and having centrally located apertures, are provided to receive a second tubular member 137 concentrically positioned within said member 134. The tubular member 137 supplies added rigidity to the reels. In addition, the elongated tubular member 137 provides ease of manipulation when assembling. Both reels are constructed in the same manner. Therefore, the reference numerals applied to the reel 32 also apply to the reel 31.

The reel-driving wheels 29 and 30 are both constructed along practically similar lines with one exception, present in the wheel 29. Both wheels have flanges 138 integral with the periphery thereof and raised bosses 139 at the center to provide an aperture for the insertion and attachment of a tubular shaft 140. The unattached end of the shaft 140 of the wheel 29 has a pinion 141 integral therewith, the teeth of which are cut parallel to the axis of said shaft. In the particular embodiment, the pinion 141 was cut in the outer surface of the shaft 140. The unattached end of the shaft 142 is untouched. The length of the shaft 140 is substantially equal to the length of the tubular member 137 plus the length of the pinion 141. The shaft 142 is substantially equal to the length of the tubular member 137 of the reel 31.

Both of the wheels 29 and 30 have attached thereto pins 143 and 144, respectively. These pins are parallel to the axis of, and extend in the same direction as, the shafts 140 and 142 and are of a diameter and length sufficient to provide a slidable fit when inserted in apertures 145 and 146, provided in the reels 32 and 31, respectively. When the reels 32 and 31 are slipped onto the shafts 140 and 142, respectively, the pins 143 and 144 engage the apertures 145 and 146 and serve to rotate said reels when motion is imparted to the wheels 29 and 30.

Means for supporting the reels and wheels illustrated in Fig. 6 are provided in the form of a rod 147, having a threaded portion 148 and a knurled knob 149 at one end thereof. The threaded portion of said rod engages a threaded aperture 150 provided in the hood-like member 42, said member 42 being integral with the frame member 38, as more clearly illustrated in Fig. 7. In practice the reels are slipped onto their respective supports, the shafts 140 and 142, and then positioned within the frame member 38, the pinion 141 extending within the hollow of the member 42. The rod 147 is inserted through the threaded aperture 150, thence through the hollow shafts 140 and 142 and into an aperture (not shown) provided in the wall of the frame member 38. The last-named aperture is, of course, in substantial alignment with the threaded aperture 150. When the rod 147 has been inserted to its full length, the threaded portion 148 will engage the threaded aperture 150 and, by manipulating the knob 149 in the proper direction, the rod is firmly held in place. The length of the rod 147 is such that the end 151 is flush with the outer surface of the frame member 38 when said rod is completely inserted as above described. The recording medium 33 is usually present on one of the reels and, when both reels are inserted in the frame member, the recording medium is taken from the loaded reel and placed in position with respect to the guiding rollers 34A and the head 35 as illustrated in Fig. 1 and the free end of the medium secured, by suitable means, to the unloaded reel. For example, apertures may be provided in the sides 130 or 131 of the reels and the free end of the medium secured to the reel by threading said medium through the apertures.

In the particular embodiment of the present invention, preference has been given to the use of aluminum in the construction of the wheels 29 and 30 and the reels 31 and 32; nevertheless, said components could be fabricated of plastic materials, with the exception of the hollow shafts 140 and 142. These should be made of a metal suitable for use as a bearing surface, it being important that drag, due to friction, be kept down to a minimum. Needle bearings may be used in the reel and wheel assembly and would further decrease the possibility of reducing unwanted friction in the rotating members.

Fig. 7 illustrates the cartridge 159 comprising the frame member 38 for supporting therein, the reel-driving wheels 29 and 30, the reels 31 and 32, the supporting member 36 which is in turn slidably carried by the rod members 37, only one of said rod members appearing in this particular view, and the electro-magnetic head 35 which is supported by the member 36. Attached to the supporting member 36 is a double-pronged member 160. As illustrated in Fig. 8, the double-pronged member 160 engages a single-pronged member 161 which is carried by a duo-directionally-threaded member 162 integral with the shaft 40. The manner in which the members 160 and 161 cooperate to distribute the recording medium 33 on the reels 31 and 32 was discussed in connection with Fig. 1 and the distributing means were referred to as the reversing mechanism 39. Engagement of the member 160 with the member 161 takes place when the cartridge 159, above described, is inserted in a compartment 163, Fig. 9, provided for in the case 10.

Attached to the inside of the frame member 38 is a rod 164 which carries thereon and has attached thereto a member 165. The member 165 is so fashioned that a portion of it extends beyond a predetermined circumference to form a lobe 166 having a pin 167 affixed thereto, said pin being parallel with the axis of the rod 164. Carried by said rod 164 is a substantially wedge-shaped member 168, the tapered portion of which is urged into the space 169 between the reel-driving wheels 29 and 30 by a helical spring 170. The spring 170 is carried by the rod 164, one end of said spring being firmly anchored in a boss 171 integral with the rod 164. The other end 172 of said spring is positioned behind the wedge-shaped member 168 and thus exerts the necessary pressure to maintain the tapered end firmly in place in the space 169.

The aforegoing arrangement provides a novel means for holding the reel-driving wheels 29 and 30 substantially immovable when the cartridge 159 is removed from the compartment 163. The pin 167 provides means which allow an appreciable amount of rotation of the member 168 without interfering with its ability to maintain the reels immovable. However, when the reels themselves are removed the member 168 will be held in its position on the rod 164.

Thus the undesirable results which would follow the removal of the cartridge 159 and subsequent unravelling of the recording mediums where it is not maintained immovable are simply and efficiently taken care of by the above arrangement.

Fig. 9 taken along line 9—9 of Fig. 1 illustrates clearly the position of the cartridge 159 when inserted in the case 10. In this position the wedge-shaped member 168 is forced out of the space 169 because the end 173 of the member 168 comes in contact with the unyielding surface of a shelf member 174. The tension on the reel-driving wheels 29 and 30 is now transferred from the member 168 and exerted by the wheel 27. Tension on the wheel 27 is caused by the spring 24A, Fig. 1, as previously described. A space 177 is provided in the frame member 38 to permit contact of the reel-driving wheels 29 and 30 with the wheels 27 and 28.

A pair of contacts 175, insulatingly attached to the frame member 38, is connected by conductors 176 to the electromagnetic head 35. These contacts are urged into intimate contact with the contacts 48 located in the amplifier section 46 when the cartridge is inserted in the compartment 163, the insertion of the cartridge likewise causing engagement of the members 160 and 161 as hereinbefore described.

The shelf 174, which is secured within the case 10, supports the reversing mechanism 39. In broken lines are illustrated the train gear comprising the driving pinion 141, the intermediate gear 41, and the driven gear 55, the last-named gear being attached to the shaft 40, said shaft being integral with the threaded member 161. The rotation of the reel-driving wheel 29 through its associated pinion 141 drives the mechanism 39 as previously described.

Fig. 10 is a perspective view of magnetic erasing head 43 and its support 44. In this view the solid line illustration depicts the erasing head 43 held, by its supporting member 45 and its maintaining pin 45A, within the fold of the main supporting structure 44. In the broken line view it is readily observed that raising the member 45, until it clears the back portion 44A of the main support 44, permits the member 45 to be removed from the aperture engaging the pin 45A. The reasons for this particular arrangement were described hereinbefore in connection with Fig. 1.

Another novel feature of the present invention is illustrated in Figs. 11 and 12. It comprises a combination power supply switch 13 and a cam-actuated arrangement controlled by the shaft 17. The shaft 17 is rotated by the pair of gears 16, one of which is attached to a shaft 16A, said shaft being affixed to the knob 15. The other gear is fastened to the shaft 17 and is actuated by the gear associated with the knob 15. The gears 16 are secured to an inner supporting wall 180 in a suitable manner, said inner wall being a part of the case 10.

Indents 181, 182 and 183 are provided in the wall 180 and a spring member 184, attached to the shaft 16A, urges a pin 185 into said indents to firmly hold the shaft 17 in the selected positions ("rewind"—"off"—"record") illustrated in Fig. 2.

Manipulation of the knob 15 rotates the shaft 17, said shaft simultaneously causing a cam member 186 and the cam member 121 to respectively urge the contact 13B toward the contact 13A and to impart a linear motion to the shaft 92 through the agency of its associated yoke-like member 122 and pin 123 secured to the shaft 17. The action of the cam 186 is readily evident in the illustration depicted in Fig. 12.

The contacts 13A and 13B of switch 13 are supported by a block 187, said block being preferably fabricated of insulating material. The block 187 also serves as a support to carry the shaft 17 at that end thereof to which is attached the cam 121. Extending through the block 187 are the terminals 188 and 189 of the contacts 13A and 13B. To these terminals are wired the power supply for the motor 11 as illustrated in Fig. 1.

Secured to the contact 13A, at the end opposite the terminal 188, is the block 69, said block being preferably made of insulating material. The block 69 is formed so that it clears the shaft 17. To said block, on the side opposite to which is fastened the contact 13A, is secured a flat spring member 68 terminating in a slotted end 190. This slot is placed athwart the shaft 61 and due to the spring action of the member 68 exerts a pressure against the annular member 67 attached to the shaft 61. As previously described, actuation of the shaft 61 in a longitudinal direction causes contact 13A to move toward or away from contact 13B, said shaft being a part of the recording time mechanism 52, Fig. 13.

Fig. 13 illustrates in greater detail the relation of the gear train in the recording time mechanism 52. The gear 65 has imparted to it rotary motion by the driving pin 72, said driving pin being secured to the shaft 56, said shaft being in turn actuated by the gear 54. The gear 54 receives its drive from the gear train 41, 55, and 141 as illustrated in Fig. 9 and previously described. The gear 63 is only rotated by hand and is secured to the shaft 61. Manipulation is by the knob 57, Fig. 1, attached to said shaft. An aperture 191 is provided in the gear 63 and is positioned approximately midway between the periphery of the gear 63 and the shaft 61. In addition to being rotated by hand, the shaft 61 can be moved linearly. Attached to the gear 65, on that side facing the gear 63, is the pin 66. Said pin extends perpendicularly from the surface of gear 65 and is secured thereto in exactly the same relative position as the aperture 191 in gear 63.

The present position of the pin 66, as illustrated in Fig. 13, keeps the gear 63 separated from the gear 65, a distance which is equal to the length of the pin 66. The length of the pin 66 is determined by the amount of clearance desired between contacts 13A and 13B as will be presently revealed.

Assume that the gear 54 has imparted to it a drive in a counter-clockwise direction. This will result in the pin 72 driving the gear 65 in a clockwise direction. As the gear 65 rotates thusly, it will eventually come into register with the aperture 191 and, when it does, the gear 63 will be urged toward the gear 65 by the spring 70. The spring 70 is positioned so that it encircles the shaft 61 and is between the gear 63 and one of the mechanism's supporting walls 71.

The action of the spring 70, which resulted in imparting a linear motion to the shaft 61, and its associated member 67, cause the member 68 to move to the right, as viewed in the Fig. 12. This action, of course, causes contact 13A to move away from 13B. The cooperative activity between the recording time mechanism in Fig. 13 and the mechanism described in Figs. 11 and 12 was described in connection with Fig. 1.

The components of the recording time mechanism 52 are supported between wall members 52A and 71, said members being held together at a predetermined distance from each other by suitable means not shown in the drawings. They were intentionally omitted from the drawings to avoid obstructing the more pertinent views.

Attached to the supporting wall member 52A, and not previously illustrated, to avoid confusion, is a plurality of flat spring members 192, 193, and 194. The spring members 192, 193, and 194 are arranged to engage the leading and following edges of the gears 54, 63, and 65, respectively. The function of said springs is to maintain said gears in proper engagement with respect to each other.

Attention is called to the fact that no particular type of material was designated for many of the components described. It will be obvious to those skilled in the art that reciprocating and rotating components should be made of materials suitable for such uses of same. In the case of rapidly rotating components it may be desirable to substitute roller bearings for friction-type bearings, etc.

While the present embodiment described the use of driving means of the friction type, gear drives fabricated of proper materials may be used with equal facility and low noise level.

Despite the small size of the present invention, it has been constructed to withstand the rough treatment which any portable equipment is usually subjected to. Furthermore, the use of a cartridge containing the recording medium and the recording and reproducing head in proper position with respect to said recording medium, and having extreme facility of loading, is a distinct departure from the previous practice in this particular art. This novel arrangement permits the user to carry any number of extra cartridges, previously threaded and ready for use in the same manner that a photographer carries an extra supply of photographic plates.

The use of the invention for "on the spot recording" of important events is but one of many to which said invention is adapted.

At conferences, its inconspicuous size, portability and absence of trailing power leads and the necessity of accessible power outlets for such leads make the present invention ideal for this type of recording. For the last-named use, it is only necessary to place the device on the conference table, plug a desk type microphone into the device and the invention is ready for instant use.

While there has been described and illustrated a particular embodiment of the present invention, it will be obvious to those skilled in the art that many changes and modifications may be made without departing from the true spirit and scope of the present invention.

What is claimed is:

1. A cartridge for use in a unit adapted for magnetic recording and reproduction including driving means and means for producing, mechanically, oscillatory motion, comprising: a frame member; means for supporting an electromagnetic recording medium within said frame member, said supporting means having driving means integral therewith and adapted, upon insertion of said cartridge in said unit, to be driven by said first-named driving means and in turn to engage and drive said mechanical oscillation-producing means; an electromagnetic head supported within said frame member; means attached to said head for guiding said recording medium from one portion of its supporting means along a path adjacent said head to another portion of said supporting means; and a pronged member attached to said head and adapted, upon insertion of said cartridge in said unit, to engage said oscillatory motion-producing means and be driven thereby, said last-named means causing said recording medium to be substantially evenly distributed on said recording medium supporting means.

2. A unit, adapted for the insertion of a cartridge containing means for supporting electromagnetic recording media and a combination electromagnetic recording and reproducing head and means for guiding said media along a path adjacent said head, including: driving means; a driven member adapted to frictionally engage said driving means; a shaft attached to said driven member; a second driven member carried by said shaft and adapted to rotate freely thereon, said second driven member including at least a pair of rotatable members, a pair of substantially flat, resilient members disposed between said rotatable members to produce a braking effect therebetween; a clutch slidably attached to said shaft and adapted to be driven thereby, said clutch being disposed on said shaft so as to engage both sides of said second driven member; and means adapted to urge said clutch into alternate engagement with said pair of rotatable members, said rotatable members being adapted, upon insertion of said cartridge, to engage and drive said media supporting means within said cartridge.

3. In combination with an electromagnetic recording and reproducing device having means for supporting electromagnetic media and an electromagnetic head and means for guiding said media along a path adjacent said head, including: driving means; a driven member adapted to frictionally engage said driving means; a shaft attached to said driven member; a second driven member carried by said shaft and adapted to rotate freely thereon, said second driven member including at least a pair of rotatable members, a pair of substantially flat, resilient members disposed between said rotatable members to produce a braking effect therebetween; a clutch slidably attached to said shaft and adapted to be driven thereby, said clutch being disposed on said shaft so as to engage both sides of said second driven member; and means adapted to urge said clutch into alternate engagement with said pair of rotatable members, said rotatable members being adapted to engage and drive said media supporting means.

4. A cartridge for use in a unit adapted for use in a magnetic recording and reproduction unit comprising: a frame member; means for supporting an electromagnetic recording medium within said frame member; braking means attached within said frame member and adapted to engage said supporting means to maintain said medium supporting means substantially immovable; means for movably supporting an electromagnetic head within said frame member comprising a plurality of parallel rods; and means for guiding said recording medium from one portion of its supporting means along a path adjacent said head to another portion of said supporting means; and means for moving said recording head on said rods, to uniformly distribute said recording medium on said supporting means, said braking means being actuated to engage said supporting means and said guiding means being deactuated by removal of said cartridge from said unit.

5. A unit, adapted for the insertion of a cartridge containing a pair of coaxially rotating members for supporting electromagnetic recording media and a combination electromagnetic recording and reproducing head, and means for guiding said media along a path adjacent said head, including: driving means; a source of current for energizing said driving means; a driven member adapted to frictionally engage said driving means; a shaft attached to said driven member; a clutch slidably attached to said shaft and adapted to be driven thereby; a second driven member carried by said shaft and adapted to rotate freely thereon; means adapted to urge said clutch into engagement with said second driven member, said second driven member being adapted, upon the insertion of said cartridge, to drive one of said media supporting members; and controlling means including a switch for controlling said current and disengaging said clutch, whereby said media supporting means and power are simultaneously controlled.

6. An electromagnetic recording and reproducing device comprising: a pair of coaxially rotating members for supporting electromagnetic media; an electromagnetic head; means for guiding said media along a path adjacent said head; driving means; a source of current for energizing said driving means; a driven member adapted to frictionally engage said driving means; a shaft attached to said driven member; a clutch slidably attached to said shaft and adapted to be driven thereby; a pair of driven members carried by said shaft and adapted to rotate freely thereon; and selective means adapted to urge said clutch into engagement with either of said driven members, each of said driven members being adapted to drive one of said media supporting members.

ROBERT GRAY.
ROBERT ELLIS.

REFERENCES CITED

The following references are of record in the file of this patent:

UNITED STATES PATENTS

| Number | Name | Date |
|---|---|---|
| 1,123,147 | Sherman | Dec. 29, 1914 |
| 1,237,496 | Fankhauser | Aug. 21, 1917 |
| 2,005,596 | Scheibell | June 18, 1935 |
| 2,213,631 | Heller | Sept. 3, 1940 |
| 2,321,812 | Heller | June 15, 1943 |
| 2,364,556 | Somers | Dec. 5, 1944 |
| 2,419,476 | Begun | Apr. 22, 1947 |

FOREIGN PATENTS

| Number | Country | Date |
|---|---|---|
| 297,327 | Great Britain | Dec. 17, 1929 |
| 363,751 | Germany | Nov. 13, 1922 |
| 375,749 | Germany | May 18, 1923 |